(12) United States Patent
Gazzino et al.

(10) Patent No.: US 11,273,920 B2
(45) Date of Patent: Mar. 15, 2022

(54) METHOD AND A DEVICE FOR MANAGING THE ENERGY OF A HYBRID POWER PLANT OF A MULTI-ROTOR AIRCRAFT

(71) Applicant: AIRBUS HELICOPTERS, Marignane (FR)

(72) Inventors: Marc Gazzino, Marseilles (FR); Bernard Faure, Marignane (FR)

(73) Assignee: AIRBUS HELICOPTERS, Marignane (FR)

( * ) Notice: Subject to any disclaimer, the term of this patent is extended or adjusted under 35 U.S.C. 154(b) by 425 days.

(21) Appl. No.: 16/520,910

(22) Filed: Jul. 24, 2019

(65) Prior Publication Data
US 2020/0031481 A1   Jan. 30, 2020

(30) Foreign Application Priority Data
Jul. 25, 2018   (FR) ..................................... 1800800

(51) Int. Cl.
 B64D 27/24   (2006.01)
 F02C 7/224   (2006.01)
 (Continued)

(52) U.S. Cl.
 CPC ............. B64D 27/24 (2013.01); B60W 20/20 (2013.01); B64C 19/02 (2013.01); F02C 7/224 (2013.01);
 (Continued)

(58) Field of Classification Search
 None
 See application file for complete search history.

(56) References Cited

U.S. PATENT DOCUMENTS 5,847,520 A     12/1998  Theurillat et al.
9,789,768 B1 *  10/2017  Meier ..................... B60L 8/003
(Continued)

FOREIGN PATENT DOCUMENTS

CN   105460212 A   4/2016
CN   106927030 A   7/2017
(Continued)

OTHER PUBLICATIONS

French Search Report for French Application No. FR 1800800, Completed by the French Patent Office, dated Apr. 8, 2019, 8 pages.
(Continued)

*Primary Examiner* — Bhavesh V Amin
(74) *Attorney, Agent, or Firm* — Brooks Kush Man P.C.

(57) ABSTRACT

A method and to a device for managing energy of a hybrid power plant of a multi-rotor aircraft during a flight. The hybrid power plant comprises a thermal engine, an electricity generator, and a plurality of electric motors, together with a plurality of electrical energy storage devices. The aircraft has a plurality of rotors driven in rotation by respective electric motors. The flight of the aircraft comprises a takeoff stage, a cruising stage, and a landing stage, the takeoff stage and the landing stage being performed solely while consuming electrical energy. The method enables an electrification ratio $R_{Elec}$ of the flight to be calculated as a function of the amounts of electrical and thermal energy that are consumed during the takeoff, landing, and cruising stages, thereby limiting the use of the thermal engine to the least possible amount during the cruising stage, and consequently reducing the associated nuisance.

12 Claims, 1 Drawing Sheet

(51) Int. Cl.
    *B64C 19/02*     (2006.01)
    *B60W 20/20*     (2016.01)
    *H02S 10/10*     (2014.01)
    *B64D 27/02*     (2006.01)

(52) U.S. Cl.
    CPC ........ *H02S 10/10* (2014.12); *B64D 2027/026* (2013.01)

(56) References Cited

U.S. PATENT DOCUMENTS

| | | |
|---|---|---|
| 9,932,118 B2 | 4/2018 | Bak et al. |
| 2013/0147204 A1 | 6/2013 | Botti et al. |
| 2014/0117148 A1 | 5/2014 | Dyrla et al. |
| 2016/0052626 A1* | 2/2016 | Vander Mey ........... B64C 27/20 244/6 |
| 2016/0167642 A1 | 6/2016 | Debert |
| 2016/0167799 A1 | 6/2016 | Smaoui et al. |
| 2017/0072804 A1 | 3/2017 | De Miranda et al. |
| 2017/0197709 A1 | 7/2017 | Fink et al. |
| 2017/0210481 A1 | 7/2017 | Bak et al. |
| 2017/0225794 A1 | 8/2017 | Waltner |
| 2017/0327219 A1 | 11/2017 | Alber |
| 2018/0009542 A1 | 1/2018 | Kuster |
| 2020/0031481 A1* | 1/2020 | Gazzino .................. F02C 7/224 |
| 2020/0164975 A1* | 5/2020 | Robertson ............... B64C 29/00 |

FOREIGN PATENT DOCUMENTS

| | | |
|---|---|---|
| DE | 102010021026 A1 | 11/2011 |
| EP | 0782941 A1 | 7/1997 |
| EP | 3034834 A1 | 6/2016 |
| FR | 2961767 A1 | 12/2011 |
| FR | 2997382 A1 | 5/2014 |
| FR | 3005296 A1 | 11/2014 |
| FR | 3033755 A1 | 9/2016 |
| WO | 2012061819 A1 | 5/2012 |
| WO | 2015123737 A1 | 8/2015 |

OTHER PUBLICATIONS

CN 105460212 A, Abstract & Machine Translation.
CN 106927030 A, Abstract & Machine Translation.
Singapore Search Report dated Jun. 2, 2020, Application No. 10201906789Q, 3 Pages.
Singapore Examination Report dated Jun. 4, 2020, Application No. 10201906789Q, 4 Pages.

* cited by examiner

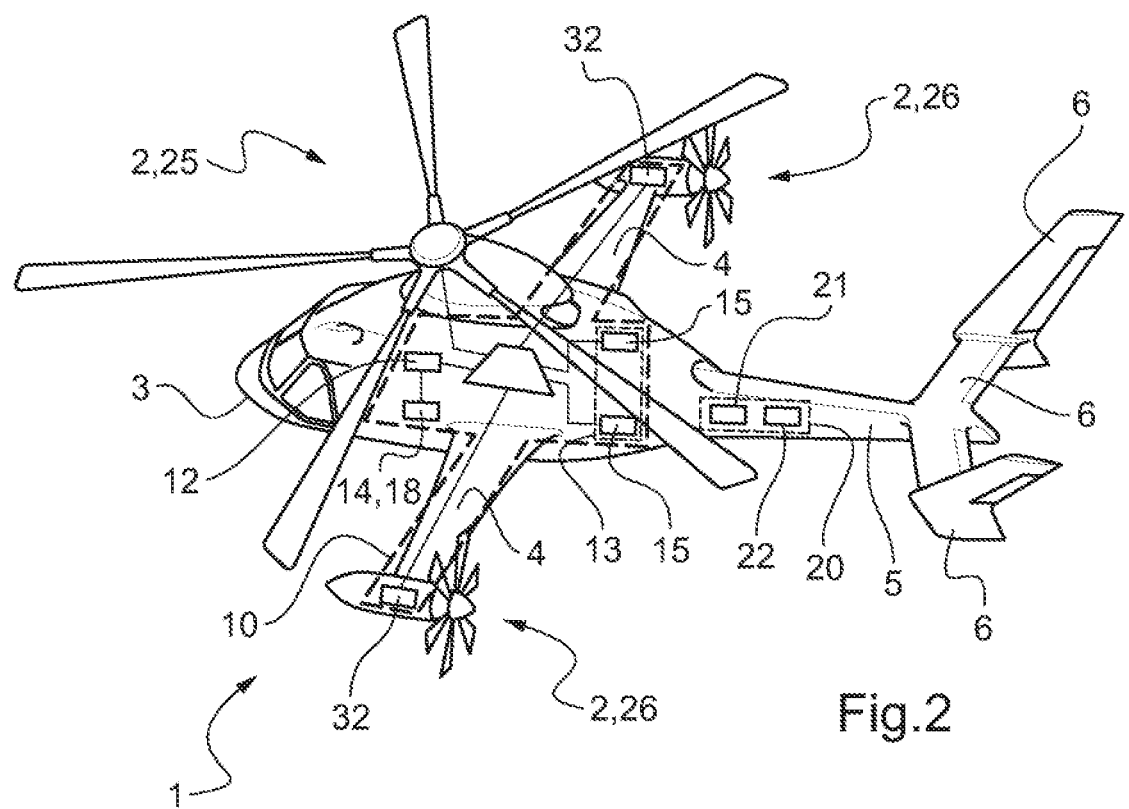
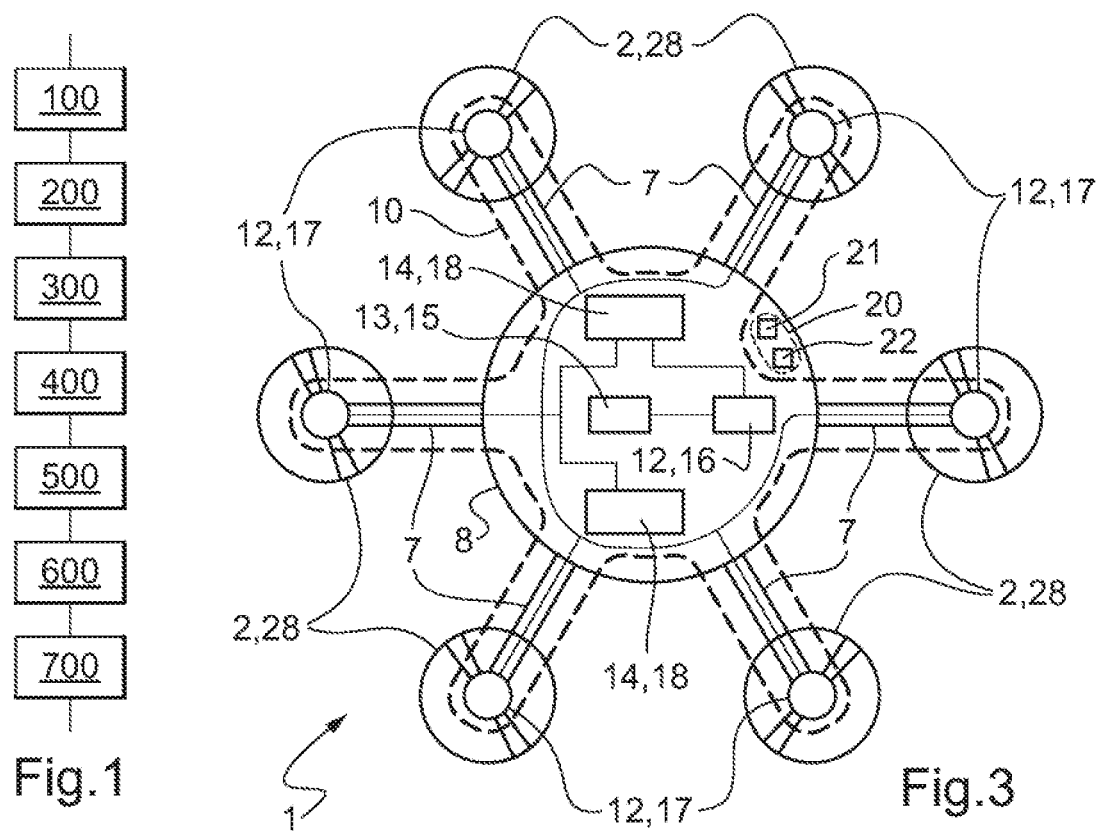

METHOD AND A DEVICE FOR MANAGING THE ENERGY OF A HYBRID POWER PLANT OF A MULTI-ROTOR AIRCRAFT

CROSS-REFERENCE TO RELATED APPLICATIONS

This application claims priority to French patent application No. FR 1800800 filed on Jul. 25, 2019, the disclosure of which is incorporated in its entirety by reference herein.

BACKGROUND OF THE INVENTION

(1) Field of the Invention

The present invention lies in the technical field of hybrid power plants for aircraft, and in particular for aircraft having a plurality of rotors. The invention relates to a method of managing energy for a hybrid power plant. The invention also relates to a multi-rotor aircraft including a hybrid power plant and a device for managing the energy of its hybrid power plant.

(2) Description of Related Art

The term "multi-rotor aircraft" is used to mean a rotary wing aircraft having at least two rotors.

By way of example, a first type of multi-rotor aircraft may have at least one main rotor and optionally an antitorque rotor, each main rotor providing the aircraft with lift and possibly also with propulsion, and, if any, an antitorque rotor opposing the yaw torque exerted by the main rotor on the fuselage of the aircraft and also serving to control yaw movements of the aircraft. Such a multi-rotor aircraft may also have one or two propulsion rotors also suitable for performing the antitorque function.

A second type of multi-rotor aircraft may have at least three rotors acting together to provide the aircraft with propulsion and lift. Such a multi-rotor aircraft as conventionally used at present may have three, four, six, or eight rotors, for example. Such a multi-rotor aircraft is also referred to as a "drone" when it does not have a pilot nor any other person on board. Each rotor is preferably driven by a respective electric motor, however it could be driven by a fuel-burning, or "thermal", engine.

An aircraft power plant is said to be "hybrid" when the power plant has two distinct sources of energy, a source of electrical energy, and a source of thermal energy. An electrical energy source may comprise at least one device for storing electrical energy, such as an optionally rechargeable battery, or indeed a fuel cell. By way of example, a thermal energy source may comprise one or more thermal engines.

In a first architecture, the hybrid power plant may have an electrical energy source, a thermal energy source, at least one electrical machine, and a mechanical power transmission provided in particular with a main power gearbox (MGB) for driving each rotor of the multi-rotor aircraft in rotation. The MGB is generally driven jointly by each thermal engine of the thermal energy source and by at least one electrical machine. Each rotor may then be driven in rotation by each thermal engine only, by at least one electrical machine only, or indeed jointly by each thermal engine and by at least one electrical machine. This first architecture is used in particular for the above-mentioned first type of multi-rotor aircraft.

An electrical machine can be reversible, in which case it can perform both a motor function and also a function of generating electricity. The electrical machine can thus operate either in an "electric motor" mode in order to provide mechanical power to the MGB, or else in an "electricity generator" mode in order to generate electrical energy from mechanical power delivered by the MGB.

An electrical machine may equally well be an electric motor that performs a motor function only. An electrical machine may equally well be an electricity generator that performs the electricity generator function only.

In a second architecture, the hybrid power plant may comprise an electrical energy source and a plurality of electrical machines, e.g. one electrical machine performing a generator function only and constituting an electricity generator, while the other electrical machines perform a motor function only and constitute respective electric motors, each driving one rotor of the multi-rotor aircraft in rotation, the hybrid power plant also comprising a thermal energy source, such as a thermal engine, driving the electricity generator. As a result, the thermal energy source serves solely to produce electrical energy by means of the electricity generator, which electrical energy is either distributed directly to the electrical machine driving the rotors in rotation, or else is stored in the electrical energy source. This second architecture is used more particularly for the second above-specified type of multi-rotor aircraft, and is referred to as "distributed propulsion".

A multi-rotor aircraft may be used in the context of an aerial transport mission for commercial, quasi-public, or indeed military purposes and in environmental zones that are sensitive, such as in built-up areas or indeed in national parks. Such aerial transport, in particular within a built-up area, is generally of short duration, being of the order of a few tens of minutes to one hour, and serves to transport one or more passengers and/or goods. Furthermore, being located in sensitive zones imposes environmental constraints on such aircraft both in terms of noise and in terms of polluting emissions.

Such sound nuisance is generated firstly by rotation of the rotors and secondly by using one or more thermal engines, in particular during stages of takeoff and landing when it is necessary for the power plant of the multi-rotor aircraft to deliver a large amount of power. Furthermore, each thermal engine is then a source of atmospheric pollution during such stages of takeoff and landing.

One solution to such nuisances might be to use a power plant that is totally electrical for such a multi-rotor aircraft. Furthermore, increasing the number of rotors of such a multi-rotor aircraft can serve to reduce the noise generated by each rotor, since each rotor can have its speed of rotation reduced.

Nevertheless, the weight of an electrical power plant and the low energy density of an electrical energy source constitute obstacles that are difficult to overcome at present. Specifically, the large weight of electrical energy storage devices limits the distance that can be traveled by such a multi-rotor aircraft and limits the payload that can be transported.

Consequently, in order to provide sufficient range for the above-described missions, it seems preferable at present to use a power plant that is hybrid or thermal only, as contrasted to a power plant that is fully electrical, in particular given the energy density of a thermal energy source, which is greater than the energy density of an electrical energy source. The term "energy density" is used to mean the quantity of energy that is available per unit weight.

The use of a rotary wing aircraft having a hydrocarbon-based thermal power plant is nowadays still the usual practice for transporting a plurality of passengers and/or a payload, regardless of the distance to be traveled. Nevertheless, ongoing studies and prototype multi-rotor aircraft with power plants that are electrical or hybrid are beginning to emerge.

Nevertheless, the cost of operating a thermal engine is greater than that of operating an electric motor, so managing or optimizing the distribution of energy consumption by electric motors and thermal engines in a hybrid power plant of an aircraft is of great importance in order to make optimum use of the aircraft. The term "optimum use" is used with respect to satisfying three essential criteria for an aerial transport mission: respect for the environment, i.e. reducing emission of pollution and noise; limiting the weight of the multi-rotor aircraft; and limiting the cost of operating it.

The prior art relating to managing such a hybrid power plant is equally applicable to both in the automotive field in which a hybrid power plant can be used and mass-produced, and in the field of aviation where studies are becoming more numerous.

In particular, patent FR 3 005 296 is known, which describes a method of optimizing the energy consumption of a hybrid vehicle, specifically as a function of relationships for managing the energy of the vehicle and its intended itineraries.

Also known is Document U.S. Pat. No. 9,932,118, which relates to an aircraft and describes operating the aircraft in two modes: a "silence" mode in which a thermal engine is not used; and a "normal" mode in which one or more thermal engines is/are used, but without optimizing energy consumption.

Furthermore, Documents EP 3 034 834, FR 2 997 382, FR 3 033 755, WO 2012/061819, EP 0 782 941, and WO 2015/123737 deal in more general manner with managing the energy of a hybrid power plant of a vehicle.

In particular, Document WO 2015/123737 relates to a system for managing energy of a vehicle by encouraging the transformation of kinetic energy into electrical energy over a specific itinerary.

Document WO 2012/061819 describes managing the energy of a hybrid motor vehicle as a function of its speed of advance.

Document FR 3 033 755 describes optimizing the management of energy between the various electrical energy storage and production means of a motor vehicle;

Finally, Documents FR 2 961 767, U.S. 2018/0009542, DE 10 2010 021 026, U.S. 2017/0225794, and U.S. 2017/0197709 form part of the technological background of the invention.

BRIEF SUMMARY OF THE INVENTION

An object of the present invention is thus to provide a method of managing the energy of a hybrid power plant of a multi-rotor aircraft during a flight of the aircraft, which method makes it possible to avoid the above-mentioned limitations while optimizing the consumption both of thermal energy and of electrical energy by the hybrid power plant. Another object of the present invention is to provide an aircraft having a device for managing the energy of a hybrid power plant of a multi-rotor aircraft during a flight of the aircraft by performing the method.

The method and the device for managing energy of a hybrid power plant thus enable the consumption of energy by the multi-rotor aircraft to be optimized while satisfying the three above-mentioned essential criteria for a mission of aerially transporting one or more passengers and/or goods, namely: respecting the environment; and limiting both the weight of the multi-rotor aircraft and also the cost of operating it.

According to the invention, there is provided a method of managing the energy of a hybrid power plant of a multi-rotor aircraft during a flight, the multi-rotor aircraft comprising:

a hybrid power plant provided with a thermal energy source, an electrical energy source, and at least one electrical machine, the thermal energy source being capable of delivering continuous thermal power $W_{Th}$, said at least one electrical machine being capable of delivering continuous electrical power $W_{ElecCont}$ and maximum electrical power $W_{ElecMax}$ that may be restricted to the takeoff and landing stages; and at least two rotors driven in rotation by the hybrid power plant.

The flight of the multi-rotor aircraft comprises a takeoff stage of duration $T_{Takeoff}$, a cruising stage of duration $T_{Cruise}$, and a landing stage of duration $T_{Landing}$. The term "cruising stage" should be understood as the stage of flight constituted by cruising flight.

The multi-rotor aircraft is characterized by a cruising power $W_{Cruise}$ needed for performing a cruising stage. This cruising power $W_{Cruise}$ is a function in particular of the aerodynamic characteristics of the multi-rotor aircraft.

The method is remarkable in that the takeoff stage and the landing stage are performed solely while consuming electrical energy delivered by the electrical energy source, and the method includes the following steps:

a first calculation of takeoff electrical energy $E_{TakeOff}$ consumed during the takeoff stage and equal to:

$$E_{TakeOff}=W_{ElecMax} \cdot T_{TakeOff}$$

a second calculation of landing electrical energy $E_{Landing}$ consumed during the landing stage and equal to:

$$E_{Landing}=W_{ElecMax} \cdot T_{Landing}$$

a third calculation of electrical cruising energy $E_{ElecCruise}$ available for the cruising stage and equal to:

$$E_{ElecCruise}=E_{ElecTotal}-W_{ElecMax} \cdot (T_{TakeOff}+T_{Landing})$$

where $E_{ElecTotal}$ is the total electrical energy available in the electrical energy source prior to starting the flight of the aircraft;

a fourth calculation of an electrical cruising power $W_{ElecCruise}$ available for the cruising stage and equal to:

$$W_{ElecCruise} = \mathrm{MIN}\left(W_{Cruise}; W_{ElecCont}; \frac{E_{ElecTotal} - W_{ElecMax} \cdot (T_{Takeoff} + T_{Landing})}{T_{Cruise}}\right)$$

a comparison of the electrical cruising power $W_{ElecCruise}$ and the cruising power $W_{Cruise}$; and a determination of a thermal cruising power $W_{ThCruise}$ needed for the cruising stage, such that:

if $W_{ElecCruise}=W_{Cruise}$; then $W_{ThCruise}=0$ and if $W_{ElecCruise}<W_{Cruise}$; then $W_{ThCruise}=W_{Cruise}-W_{ElecCruise}$.

By way of example, a thermal energy source comprises at least one thermal engine. By way of example, an electrical energy source comprises at least one electrical energy storage device, such as an optionally rechargeable battery, or indeed a fuel cell, for example.

The multi-rotor aircraft preferably includes at least three rotors acting together to provide it with lift and propulsion. By way of example, such a multi-rotor aircraft has three, four, six, or eight rotors. The hybrid power plant, then preferably has at least four electrical machines, each rotor of the multi-rotor aircraft being driven in rotation by a respective one of the electrical machines performing solely a motor function and thus forming an electric motor. As a result, the power plant has as many electric motors as there are rotors.

The installation also has an electrical machine performing solely a generator function, thereby forming an electricity generator, which machine is driven in rotation by the thermal energy source in order to generate electrical energy.

In a variant, the hybrid power plant may include an electrical energy source, a thermal energy source, at least one electrical machine, and a main power transmission gearbox (MGB). The MGB is driven both by the thermal energy source having at least one thermal engine and by at least one electrical machine, and it drives each rotor of the multi-rotor aircraft in rotation. An electrical machine may be reversible, or else it may be an electricity generator for the purpose of generating electrical energy while it is being driven in rotation by the MGB, or by the thermal energy source.

Furthermore, the multi-rotor aircraft may also include a main rotor and an antitorque rotor, the main rotor providing the aircraft with lift and possibly also with propulsion. The multi-rotor aircraft may also have a main rotor and two propulsion rotors that also perform the antitorque function.

The multi-rotor aircraft is adapted for aerial transport missions, preferably of short duration of the order of a few tens of minutes to one hour, in particular in zones that are environmentally sensitive, such as build-up areas or national parks, for example.

The multi-rotor aircraft also has calculator or indeed a processor for performing the method of the invention and at least one memory for storing instructions enabling the method to be performed and for storing the characteristics of the multi-rotor aircraft and of the hybrid power plant.

In addition, the electrical energy source, i.e. each electrical energy storage device, and an electrical machine are capable of delivering the maximum electrical power $W_{ElecMax}$ for a limited length of time, of the order of a few minutes, typically three minutes. Beyond that limited time, the electrical energy source and the electrical machine need to deliver the continuous electrical power $W_{ElecCont}$ so as to avoid problems of overheating and/or of degrading the electrical machine and/or the electrical energy source. An electrical machine is generally designed to deliver a maximum power that is compatible with the power needed by the aircraft for takeoff and for landing and that is greater than the power that can be delivered by the electrical energy source.

When the electrical energy source has a plurality of electrical energy storage devices, the continuous electrical power delivered by the hybrid power plant is the sum of the continuous electrical powers $W_{ElecCont}$ of those electrical energy storage devices, and the maximum electrical power delivered by the power plant is the sum of the maximum electrical powers $W_{ElecMax}$ of those electrical energy storage devices.

Using only electrical energy as delivered by the electrical energy source during takeoff and landing stages serves advantageously to reduce the level of sound nuisance and to eliminate the atmospheric pollution generated by the multi-rotor aircraft. Furthermore, and unlike a thermal engine, an electrical energy source and an electric motor can deliver their maximum power without needing to reach an operating temperature. Specifically, the takeoff stage may advantageously be performed quickly without waiting for a warm-up time. The takeoff procedure is thus shorter compared with an aircraft using a thermal engine for the takeoff stage, and the time saving is not negligible, given the short duration of the flight.

Furthermore, the third calculation of the available electrical cruising energy $E_{ElecCruise}$ for the cruising stage and the comparison of the electrical cruising power $W_{ElecCruise}$ with the cruising power $W_{Cruise}$ serve advantageously to limit the use of the thermal energy source to the minimum needed, and thereby limit the atmospheric pollution generated by the multi-rotor aircraft to the strict minimum. In addition, the method of the invention also makes it possible to consume a maximum amount of electrical energy from the electrical energy source of the hybrid power plant.

Knowing the use that is to be made of the thermal energy source during a flight thus makes it possible to take on board just enough fuel for the needs of the thermal energy source, thereby correspondingly increasing the payload of the multi-rotor aircraft.

Finally, if the thermal cruising power $W_{ThCruise}$ needed for the cruising stage is zero, then the thermal energy source is not needed for this flight and can therefore be removed to the advantage of an even greater payload.

Furthermore, the takeoff and landing stages are the stages of flight that require the most power during the flight of the multi-rotor aircraft. Specifically, each electrical machine driving a rotor during these takeoff and landing stages should preferably be operating at the maximum electrical power $W_{ElecMax}$ delivered by the electrical energy source during those stages of takeoff and landing. Consequently, each electrical machine is controlled so that the electrical energy source delivers its maximum electrical power $W_{ElecMax}$ during the stages of takeoff and landing and its continuous electrical power $W_{ElecCont}$ during the cruising stage.

Under such circumstances, the duration $T_{Takeoff}$ of the takeoff stage and the duration $T_{Landing}$ the landing stage are defined and the takeoff electrical energy $E_{TakeOff}$ and the landing electrical energy $E_{Landing}$ that are consumed respectively during the takeoff stage and the landing stage are calculated as a function of the maximum electrical power $W_{ElecMax}$.

Before the aircraft starts its flight, the electrical energy source has available some total amount ox electrical energy $E_{ElecTotal}$. The cruising electrical energy $E_{ElecCruise}$ that is available for the cruising stage is then equal to that total electrical energy $E_{ElecTotal}$ minus the takeoff electrical energy $E_{TakeOff}$ that was consumed during the takeoff stage and also minus the landing electrical energy $E_{Landing}$ that is to be consumed during the landing stage:

$$E_{ElecCruise} = E_{ElecTotal} - E_{TakeOff} - E_{Landing}$$

i.e.:

$$E_{ElecCruise} = W_{ElecTotal} - W_{ElecMax} \cdot (T_{TakeOff} + T_{Landing}).$$

The maximum power that the hybrid power plant can deliver when operating solely with the electrical energy source is then the ratio of the available cruising electrical energy $E_{elecCruise}$ divided by the duration $T_{Cruise}$ of the cruising stage. Nevertheless, under such circumstances, the hybrid power plant should not deliver power greater than the continuous electrical power $W_{ElecCont}$. Consequently, the cruising electrical power $W_{ElecCruise}$ that can be provided by the hybrid power plant during the cruising stage is equal to the minimum value selected from among: the ratio of the available cruising electrical energy $E_{ElecCruise}$ divided by the duration $T_{Cruise}$; the continuous electrical power $W_{ElecCont}$; and the cruising power $W_{Cruise}$ needed for performing the cruising stage, such that:

$$W_{ElecCruise} = \text{MIN}\left(W_{Cruise}; W_{ElecCont}; \frac{E_{ElecCruise}}{T_{Cruise}}\right)$$

i.e.;

$$W_{ElecCruise} = \text{MIN}\left(W_{Cruise}; W_{ElecCont}; \frac{E_{ElecTotal} - W_{ElecMax} \cdot (T_{Takeoff} + T_{Landing})}{T_{Cruise}}\right).$$

Finally, by comparing this cruising electrical power $W_{ElecCruise}$ with the cruising power $W_{Cruise}$ of the multi-rotor aircraft, it becomes possible to determine whether it is necessary to make use of the thermal energy source together with the electrical energy source in order to deliver the power needed for the cruising stage, or on the contrary whether the electrical energy source suffices.

Furthermore, the method of the invention may include a fifth calculation of an electrification ratio $R_{Elec}$ of the flight of the aircraft. This electrification ratio $R_{Elec}$ corresponds to the ratio of the electrical energy consumed during the flight divided by the total energy consumed, i.e. the sum of the amount of the electrical energy plus the amount of thermal energy consumed during the flight. Specifically, if the flight is performed using only the electrical energy delivered by the electrical energy source, then the electrification ratio $R_{Elec}$ is equal to 1.

Since the multi-rotor aircraft is characterized by the cruising power $W_{Cruise}$, it is possible to define a proportion between this cruising power $W_{Cruise}$ the takeoff power needed to enable the multi-rotor aircraft to take off, i.e. the maximum electrical power $W_{ElecMax}$, in the following manner:

$$\lambda = \frac{W_{Cruise}}{W_{ElecMax}}.$$

This proportion $\lambda$ is a characteristic of the multi-rotor aircraft that is a function of its aerodynamic characteristics and of the characteristics of its hybrid power plant.

The electrification ratio $R_{Elec}$ is then written:

$$R_{Elec} = \frac{T_{TakeOff} + T_{Landing} + \text{MIN}\left(\lambda; \frac{W_{ElecCont}}{W_{ElecMax}}; \frac{E_{ElecTotal} - W_{ElecMax} \cdot (T_{Takeoff} + T_{Landing})}{T_{Cruise} \cdot W_{ElecMax}}\right) \cdot T_{Cruise}}{T_{TakeOff} + T_{Landing} + \lambda \cdot T_{Cruise}}.$$

In addition, the method of the invention may make provision for an operating reserve of electrical energy. This operating reserve of electrical energy is constituted by a fraction of the total available electrical energy $E_{ElecTotal}$ from the electrical energy source that is not taken into account for flying proper, but that is kept in reserve in case of need. This need may appear, for example, if the aircraft is rerouted, if there is an unexpected head wind, or indeed if the aircraft needs to wait before landing.

For this purpose, an operating reserve of electrical energy $E_{ElecReser}$ may for example be deduced from the total available electrical energy $E_{ElecTotal}$ in order to determine the cruising electrical energy $E_{ElecCruise}$ that is available for the cruising stage. Under such circumstances, the cruising electrical energy $E_{ElecCruise}$ is then equal to the total electrical energy $E_{ElecTotal}$ minus the takeoff electrical energy $E_{TakeOff}$, the landing electrical energy $E_{Landing}$, and also the operating reserve of electrical energy $E_{ElecReser}$, such that:

$$E_{ElecCruise} = E_{ElecTotal} - E_{TakeOff} - E_{Landing} - E_{ElecReser}$$

i.e.:

$$E_{ElecCruise} = E_{ElecTotal} - W_{ElecMax} \cdot (T_{TakeOff} + T_{Landing}) - E_{ElecReser}.$$

This operating reserve of electrical energy that is reserved in this way may also be characterized by a duration $T_{Reser}$ of an operating reserve stage. This duration $T_{Reser}$ is added to the duration $T_{Cruise}$ of the cruising stage when calculating the cruising electrical power $W_{ElecCruise}$ and the electrification ratio $R_{Elec}$ of the flight of the aircraft, such that:

$$W_{ElecCruise} = \text{MIN}\left(W_{Cruise}; W_{ElecCont}; \frac{E_{ElecTotal} - W_{ElecMax} \cdot (T_{Takeoff} + T_{Landing})}{T_{Cruise} + T_{Reser}}\right)$$

and $$R_{Elec} = \frac{T_{TakeOff} + T_{Landing} + \text{MIN}\left(\lambda; \frac{W_{ElecCont}}{W_{ElecMax}}; \frac{E_{ElecTotal} - W_{ElecMax}(T_{Takeoff} + T_{Landing})}{(T_{Cruise} + T_{Reser}) \cdot W_{ElecMax}}\right) \cdot T_{Cruise}}{T_{TakeOff} + T_{Landing} + \lambda \cdot T_{Cruise}}$$

Furthermore, the electrical energy source often includes one or more electrical energy storage devices, generally formed by respective chargeable or non-rechargeable batteries. A battery is characterized by the energy capacity $E_{Bat}$ equal to the total available electrical energy $E_{ElecTotal}$. This energy capacity $E_{Bat}$ is equal to the product of the energy density $DE_{Bat}$, expressed in kilowatt hours per kilogram (kWh/kg) of the battery divided by its weight M such that:

$$E_{Bat} = DE_{Bat} \cdot M.$$

Furthermore, the maximum electrical power $W_{ElecMax}$ that a battery can deliver is equal to the product of the power density $DW_{Bat}$, expressed in kilowatts per kilogram (kW/kg) of the battery divided by its weight M, such that:

$$W_{ElecMax} = DW_{Bat} \cdot M.$$

The continuous electrical power $W_{ElecCont}$ of the battery may be defined as being proportional to its maximum electrical power $W_{ElecMax}$ in application of a continuous use coefficient $$\left(K_{CONT} \cdot \frac{DE_{Bat}}{DW_{Bat}}\right)$$

which is strictly less than 1, $K_{CONT}$ being equal to the continuous discharge rate, i.e.:

$$W_{ElecCont} = K_{CONT} \cdot E_{Bat} = K_{CONT} \cdot \frac{DE_{Bat}}{DW_{Bat}} \cdot W_{ElecMax}.$$

The continuous discharge rate $K_{CONT}$ is expressed in reciprocal time units and it is defined such that:

$$K_{CONT} = \frac{1}{T_{CONT}}$$

where $T_{CONT}$ is the continuous discharge time expressed in hours, e.g. being about ⅓ of an hour. The continuous utilization coefficient $$\left(K_{CONT} \cdot \frac{DE_{Bat}}{DW_{Bat}}\right)$$

is then greater than 0.3 and less than 0.6.

Furthermore, in order to avoid degrading the battery and in order to limit aging of the battery, it is preferable not to consume all of the electrical energy available in the battery. As a general rule, a discharge depth greater than or equal to 10% is used. The total electrical energy $E_{ElecTotal}$ available in the battery is then written $$E_{ElecTotal} = k1 \cdot E_{Bat}$$

where k1 is a normal utilization coefficient that is strictly less than 1, for example that is greater than 0.5 and less than 0.75.

By taking account of these characteristics of a battery, the cruising electrical power $W_{ElecCruise}$ and the electrification ratio $R_{Elec}$ of the flight of the aircraft can then be written as follows:

$$W_{ElecCruise} = \operatorname{MIN}\left(W_{Cruise}; W_{ElecCont}; \frac{E_{ElecTotal} - W_{ElecMax} \cdot (T_{TakeOff} + T_{Landing})}{T_{Cruise} + T_{Reser}}\right)$$

and $$R_{Elec} = \frac{T_{TakeOff} + T_{Landing} + \operatorname{MIN}\left(\lambda; K_{CONT} \cdot \frac{DE_{BATT}}{DW_{BATT}}; \frac{k1 \cdot \frac{DE_{BATT}}{DW_{BATT}} - (T_{TakeOff} + T_{Landing})}{T_{Cruise} + T_{Reser}}\right) \cdot T_{Cruise}}{T_{TakeOff} + T_{Landing} + \lambda \cdot T_{Cruise}}$$

In the event of an emergency and/or of danger, and in particular in the event of a failure of the thermal energy source occurring during the cruising stage or indeed during the landing stage, the normal utilization coefficient k1 is replaced by an emergency coefficient k2 that is strictly greater than k1. Specifically, the margin used in normal operation for the multi-rotor aircraft in order to limit aging of the battery is reduced in order to ensure the safety of the multi-rotor aircraft. Naturally, it is preferable to enable the aircraft to land while degrading its battery as contrasted with allowing the aircraft to crash on the pretext of preserving its battery. The total electrical energy $E_{ElecTotal}$ available in the electrical energy source is such that $$E_{ElecTotal} = k2 \cdot E_{Bat}.$$

The emergency coefficient k2 is strictly less than 1, and by way of example it may be strictly greater than 0.75.

As a result, an exceptional reserve of electrical energy $E_{ElecExcep}$ is available to mitigate such a failure of the thermal energy source so as to enable the aircraft to operate completely electrically in order to continue cruising for a few additional minutes and/or in order to land in spite of the failure. This exceptional reserve of electrical energy $E_{ElecExcep}$ is such that:

$$E_{ElecExcep} = (k2 - k1) \cdot E_{Bat}.$$

Finally, when the electrical energy source has n electrical energy storage devices, n being an integer greater than or equal to 1, the total electrical energy $E_{ElecTotal}$ available in the electrical energy source is such that:

$$E_{ElecTotal} = \sum_{i=1}^{n} (E_{Bat})_i$$

where i is a positive integer lying in the range 1 to n and $(E_{Bat})_i$ is the energy capacity of a storage device of rank i.

By taking account of a normal utilization coefficient k1 that is identical for each storage device, the total electrical energy $E_{ElecTotal}$ available in the electrical energy source is such that:

$$E_{ElecTotal} = k1 \cdot \sum_{i=1}^{n} (E_{Bat})_i$$

where k1 is the normal utilization coefficient of the battery and is strictly less than 1.

By taking account of these characteristics of a battery, the cruising electrical power $W_{ElecCruise}$ and the electrification ratio $R_{Elec}$ of the flight of the aircraft can then be written such that:

$$W_{ElecCruise} = \operatorname{MIN}\left(W_{Cruise}; W_{ElecCont}; \frac{E_{ElecTotal} - W_{ElecMax} \cdot (T_{TakeOff} + T_{Landing})}{T_{Cruise} + T_{Reser}}\right)$$

and $$R_{Elec} = \frac{T_{TakeOff} + T_{Landing} + \operatorname{MIN}\left(\lambda; K_{CONT} \cdot \sum_{i=1}^{n}\left(\frac{DE_{BATT}}{DW_{BATT}}\right)_i; \frac{k1 \cdot \sum_{i=1}^{n}\left(\frac{DE_{BATT}}{DW_{BATT}}\right)_i - (T_{TakeOff} + T_{Landing})}{T_{Cruise} + T_{Reser}}\right) \cdot T_{Cruise}}{T_{TakeOff} + T_{Landing} + \lambda \cdot T_{Cruise}}.$$

In the event of an emergency and/or of danger, the normal utilization coefficient k1 is replaced, as mentioned above, by the emergency coefficient k2, which is strictly greater than k1. The total electrical energy $E_{ElecTotal}$ that is available in the electrical energy source is then such that:

$$E_{ElecTotal} = k2 \cdot \sum_{i=1}^{n} (E_{Bat})_i.$$

The present invention also provides a multi-rotor aircraft as described above and including a device for managing the energy of the hybrid power plant of the multi-rotor aircraft so as to perform the above-described method and so as to determine in particular the electrification ratio $R_{Elec}$ of the flight and whether or not it is necessary to use the thermal energy source.

The device for managing the energy of the hybrid power plant of the multi-rotor aircraft includes in particular calculator or indeed a processor for performing the above-described method together with at least one memory for storing the characteristics of the multi-rotor aircraft and the characteristics of its hybrid power plant. A calculator may comprise any type of processor, such as a central processing unit (CPU) or a graphics processing unit (CPU), including a general purpose processor, a digital signal processor (DSP), a microcontroller, an application specific integrated circuit (ASIC), a field programmable gate array (FPGA).

BRIEF DESCRIPTION OF THE DRAWINGS

The invention and its advantages appear in greater detail from the context of the following description of embodiments given by way of illustration and with reference to the accompanying figures, in which:

FIG. 1 is a block diagram of a method of managing the energy of a hybrid power plant of a multi-rotor aircraft; and FIGS. 2 and 3 show two multi-rotor aircraft, each fitted with a device for managing the energy of a hybrid power plant of the multi-rotor aircraft 1.

DETAILED DESCRIPTION OF THE INVENTION

Elements present in more than one of the figures are given the same references in each of them.

FIG. 1 is a block diagram of a method of managing the energy of the hybrid power plant of a multi-rotor aircraft 1. FIGS. 2 and 3 show two examples of a multi-rotor aircraft 1 fitted with a hybrid power plant 10 and with a device 20 for managing the energy of the hybrid power plant 10 of the multi-rotor aircraft.

The method and the device 20 serve to determine, and consequently to optimize, the distribution of how different kinds of energy are consumed in the hybrid power plant 10 of the multi-rotor aircraft 1 over a complete flight.

In a manner that is common to both of these examples, a multi-rotor aircraft 1 has a hybrid power plant 10, a device 20 for managing the energy of the hybrid power plant 10, and a plurality of rotors 2 driven in rotation by the hybrid power plant 10. The hybrid power plant 10 has at least one thermal engine 15 constituting a thermal energy source 13, at least one electrical energy storage device 18 constituting an electrical energy source 14, and at least one electrical machine 12. The device 20 for managing the energy of the hybrid power plant 10 comprises a calculator 21 and a memory 22.

The first example of a multi-rotor aircraft 1 as shown in FIG. 2 also has a fuselage 3, two wings 4 on either side of the fuselage 3, and a tail boom 5 carrying tail fins 6. This first multi-rotor aircraft 1 has three rotors 2 constituted firstly by a main rotor 25 positioned above the fuselage 3, and secondly by two propulsive propellers 26 positioned at the ends of each of the wings 4.

The hybrid power plant 10 of this first example of a multi-rotor aircraft 1 comprises more precisely two thermal engines 15 forming the thermal energy source 13, an electrical energy storage device 18 constituting the electrical energy source 14, a reversible electrical machine 12 having both a motor function and an electricity generator function, and a mechanical power transmission 30. The mechanical power transmission 30 serves to transmit the energy supplied by the thermal engine 15 and by the electrical machine 12 to the main rotor 2, 25 and to the propulsion propellers 2, 26. The mechanical power transmission 30 comprises a main gearbox (MGB) 31 and two auxiliary gearboxes (AGBs) 32. The MGB 31 is driven in rotation by the thermal engines 15 and by the electrical machine 12 when it is operating in motor mode, and it drives rotation of the main rotor 2, 25 and also of the two AGBs 32. Each AGB 32 then drives a respective one of the propulsion propellers 2, 26 in rotation. The MGB 31 may also drive rotation of the electrical machine 12 when it is operating in electricity generator mode in order to supply electrical energy that can be stored in the storage device 18.

As shown in FIG. 3, the second example of a multi-rotor aircraft 1 has six rotors 2, with each of these six rotors 2 constituting a lift and propulsion rotor 28, a central portion 8, and six arms 7 secured to the central portion 8 and each carrying at its end a respective one of the rotors 2, 28.

The hybrid power plant 10 in this second example of a multi-rotor aircraft 1 comprises more precisely a, thermal engine 15 forming the thermal energy source 13, two electrical storage devices 18 constituting the electrical energy source 14, and seven electrical machines 12 comprising firstly an electricity generator driven by the thermal engine 15, and secondly six electric motors 17, with each of these electric motors 17 driving a respective one of the rotors 2, 28. The six electric motors 17 and the electricity generator 16 are connected electrically to the electrical energy source 14.

The method of managing the energy of the hybrid power plant 10 of a multi-rotor aircraft 1 as shown diagrammatically in FIG. 1 may be performed by the device 20 that is included in both of these examples a multi-rotor aircraft 1. The method comprises seven steps and serves to determine, and consequently to optimize, the distribution of how electrical energy and thermal energy are consumed in the hybrid power plant 10 of the multi-rotor aircraft 1 over a complete flight for the purpose, amongst others, of limiting sound and polluting nuisances of the flight for the environment. Such a complete flight of the multi-rotor aircraft 1 includes a takeoff stage for a duration $T_{Takeoff}$, a cruising stage for a duration $T_{Cruise}$, and a landing stage for a duration $T_{Landing}$.

Advantageously, the takeoff stage and the landing stage are performed while consuming only electrical energy as supplied by the electrical energy source 14, with the rotors 2 being driven solely by the electrical machines 12. As a result, the sound nuisance of the multi-rotor aircraft 1 is limited to the noise generated by the rotation of the rotors 2, and the atmospheric pollution that is generally caused by a thermal engine 15 is eliminated during these stages of takeoff and landing.

The hybrid power plant 10 has characteristics defining the powers that it is capable of delivering. The hybrid power plant 10 may deliver continuous thermal power $W_{Th}$ by using the thermal energy source 13 only. The hybrid power plant 10 can deliver maximum electrical power $W_{ElecMax}$ for a limited duration, and continuous electrical power $W_{ElecCont}$ in continuous manner while using only the electrical energy source 14 powering each electrical machine 12.

Furthermore, the multi-rotor aircraft 1 has cruising power $W_{Cruise}$ necessary for performing a cruising stage.

The characteristics of the multi-rotor aircraft 1 and the characteristics of the hybrid power plant 10 are stored in the memory 22 together with instructions for performing the method of managing the energy of the hybrid power plant 10.

During a first calculation 100, a takeoff amount of electrical energy $E_{TakeOff}$ to be consumed during the takeoff stage is determined. This takeoff electrical energy $E_{TakeOff}$ is such that:

$$E_{TakeOff} = W_{ElecMax} \cdot T_{TakeOff}.$$

During a second calculation 200, a landing amount of electrical energy $E_{Landing}$ to be consumed during a stage of landing is determined. This landing electrical energy $E_{Landing}$ is such that:

$$E_{Landing} = W_{ElecMax} \cdot T_{Landing}.$$

The first calculation 100 and the second calculation 200 may be performed simultaneously, or else sequentially.

Thereafter, during a third calculation 300, a cruising amount of electrical energy $E_{ElecCruise}$ available for the cruising stage is determined by subtracting the takeoff electrical energy $E_{TakeOff}$ and the landing electrical energy $E_{Landing}$ from the total electrical energy $E_{ElecTotal}$ available in the electrical energy source 14 before takeoff of the flight of the aircraft 1. The cruising electrical energy $E_{ElecCruise}$ is such that:

$$E_{ElecCruise} = E_{ElecTotal} - W_{ElecMax} \cdot (T_{TakeOff} + T_{Landing}).$$

In addition, an operating reserve of electrical energy $E_{ElecReser}$ may also be subtracted from the total electrical energy $E_{ElecTotal}$ in order to determine the cruising electrical energy $E_{ElecCruise}$ that is available for the cruising stage. This operating reserve of electrical energy $E_{ElecReser}$ serves to anticipate a potential incident that might occur during the cruising stage or indeed the landing stage. An incident may be a failure of a thermal engine 15 of the thermal energy source 13 during the cruising stage, or indeed an interruption of the landing stage, or indeed a change of landing site.

This operating reserve of electrical energy $E_{ElecReser}$ is then added to the portion of the electrical energy from the electrical energy source 14 that has not yet been consumed, so that the multi-rotor aircraft 1 can land safely. The cruising electrical energy $E_{ElecCruise}$ is then such that:

$$E_{ElecCruise} = E_{ElecTotal} - E_{TakeOff} - E_{Landing} - E_{ElecReser}$$

i.e.:

$$E_{ElecCruise} = E_{ElecTotal} - W_{ElecMax} \cdot (T_{TakeOff} + T_{Landing}) - E_{ElecReser}.$$

During a fourth calculation 400, a cruising amount of electrical power $W_{ElecCruise}$ that can be delivered by the hybrid power plant 10 for the cruising stage is determined. This cruising electrical power $W_{ElecCruise}$ is limited by the capacity of each electrical machine 12 to deliver power continuously. As a result, this cruising electrical power $W_{ElecCruise}$ is equal to the minimum value selected from among: the ratio of the cruising electrical energy $E_{ElecCruise}$ available for the duration $T_{Cruise}$; the continuous electrical power $W_{ElecCont}$; and the cruising power $W_{Cruise}$ needed for performing a cruising stage, such that:

$$W_{ElecCruise} = \mathrm{MIN}\left(W_{Cruise}; W_{ElecCont}; \frac{E_{ElecCruise}}{T_{Cruise}}\right)$$

i.e.:

$$W_{ElecCruise} = \mathrm{MIN}\Bigg(W_{Cruise}; W_{ElecCont};$$

$$\frac{E_{ElecTotal} - W_{ElecMax} \cdot (T_{TakeOff} + T_{Landing}) - E_{ElecReser}}{T_{Cruise}}\Bigg).$$

The operating reserve of electrical energy $E_{ElecReser}$ mentioned above may also be taken into account when calculating this cruising electrical power $W_{ElecCruise}$ and is then not deduced from the total electrical energy $E_{ElecTotal}$. This operating reserve of electrical energy $E_{ElecReser}$ may be characterized by a duration $T_{Reser}$ for an operating reserve stage. This duration $T_{Reser}$ is added to the duration $T_{Cruise}$ for the cruising stage while calculating the cruising electrical power $W_{ElecCruise}$, such that:

$$W_{ElecCruise} = \mathrm{MIN}\left(W_{Cruise}; W_{ElecCont}; \frac{E_{ElecTotal} - W_{ElecMax} \cdot (T_{TakeOff} + T_{Landing})}{T_{Cruise} + T_{Reser}}\right).$$

During a comparison 500, the cruising electrical power $W_{ElecCruise}$ is compared with the cruising power $W_{Cruise}$, this cruising power $W_{Cruise}$ being a function of the aerodynamic characteristics of the multi-rotor aircraft 1.

During a determination 600, a cruising thermal power $W_{ThCruise}$ needed for the cruising stage is determined after the comparison 500.

If the electrical cruising power $W_{ElecCruise}$ is equal to the cruising power $W_{Cruise}$, then the thermal cruising power $W_{ThCruise}$ needed for the cruising stage is zero, and the entire flight of the multi-rotor aircraft 1, including its cruising stage, is performed by making use only of the electrical energy contained in the electrical energy source 14.

In contrast, if the electrical cruising power $W_{ElecCruise}$ is less than the cruising power $W_{Cruise}$, then the thermal cruising power $W_{ThCruise}$ needed for the cruising stage is not zero. Consequently, the electrical energy contained in the electrical energy source 14 is not sufficient on its own to perform the entire flight of the multi-rotor aircraft 1. The thermal energy source 13 must therefore be used, but only during the cruising stage, so as to limit the nuisance generated by the thermal energy source 13 to this cruising stage, which takes place at altitude, and thus as far away as possible from inhabited zones. The thermal cruising power $W_{ThCruise}$ is such that:

$$W_{ThCruise} = W_{Cruise} - W_{ElecCruise}$$

i.e.:

$$W_{ThCruise} = W_{Cruise} -$$

$$\mathrm{MIN}\left(W_{Cruise}; W_{ElecCont}; \frac{E_{ElecTotal} - W_{ElecMax} \cdot (T_{TakeOff} + T_{Landing})}{T_{Cruise}}\right).$$

During a fifth calculation 700, an electrification ratio $R_{Elec}$ for the flight of the multi-rotor aircraft 1 is determined. This electrification ratio $R_{Elec}$ of the flight is calculated as a function of the amounts of electrical energy and of thermal energy consumed during the flight and is equal to the ratio of the electrical energy consumed during the flight divided by the total energy consumed by the hybrid power plant 10 during the flight. This electrification ratio $R_{Elec}$ for the flight is such that:

$$R_{Elec} = \frac{T_{TakeOff} + T_{Landing} + \text{MIN}\left(\lambda;\ \frac{W_{ElecCont}}{W_{ElecMax}};\ \frac{E_{ElecTotal} - W_{ElecMax} \cdot (T_{TakeOff} + T_{Landing})}{T_{Cruise} \cdot W_{ElecMax}}\right) \cdot T_{Cruise}}{T_{TakeOff} + T_{Landing} + \lambda \cdot T_{Cruise}}$$

where $\lambda$ is the proportion between the cruising power $W_{Cruise}$ and the maximum electrical power $W_{ElecMax}$ used for the takeoff stage, such that:

$$\lambda = \frac{W_{Cruise}}{W_{ElecMax}}.$$

Thus, the electrification ratio $R_{Elec}$ serves to determine whether it is or is not necessary to use the thermal energy source in order to perform the flight, and also to know the proportion of thermal energy that is needed. It is then possible to deduce therefrom the quantity of fuel that is needed for performing the flight. In particular, if the electrification ratio $R_{Elec}$ is equal to 1, then the flight of the multi-rotor aircraft 1 is performed by using only the electrical energy delivered by the electrical energy source.

If an operating reserve stage of duration $T_{Reser}$ is taken into account when calculating the electrical cruising power $W_{ElecCruise}$, then the electrification ratio $R_{Elec}$ for the flight is such that:

$$R_{Elec} = \frac{T_{TakeOff} + T_{Landing} + \text{MIN}\left(\lambda;\ \frac{W_{ElecCont}}{W_{ElecMax}};\ \frac{E_{ElecTotal} - W_{ElecMax}(T_{TakeOff} + T_{Landing})}{(T_{Cruise} + T_{Reser}) \cdot W_{ElecMax}}\right) \cdot T_{Cruise}}{T_{TakeOff} + T_{Landing} + \lambda \cdot T_{Cruise}}.$$

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of managing the energy of a hybrid power plant of a multi-rotor aircraft during a flight, the multi-rotor aircraft comprising:
a hybrid power plant having a thermal energy source, an electrical energy source, and at least one electrical machine, the thermal energy source being suitable for delivering continuous thermal power $W_{Th}$, the electrical machine(s) being capable of delivering continuous electrical power $W_{ElecCont}$ and also of delivering maximum electrical power $W_{ElecMax}$; and
at least two rotors driven in rotation by the hybrid power plant;
the flight including a takeoff stage of duration $T_{TakeOff}$, a cruising stage of duration $T_{Cruise}$, and a landing stage of duration $T_{Landing}$, the multi-rotor aircraft having cruising power $W_{Cruise}$ necessary for performing a cruising stage;
wherein the takeoff stage and the landing stage are performed solely while consuming electrical energy delivered by the electrical energy source, and the method includes the following steps:
a first calculation of takeoff electrical energy $E_{TakeOff}$ consumed during the takeoff stage and equal to:

$$E_{TakeOff} = W_{ElecMax} \cdot T_{TakeOff}$$

a second calculation of landing electrical energy $E_{Landing}$ consumed during the landing stage and equal to:

$$E_{Landing} = W_{ElecMax} \cdot T_{Landing}$$

a third calculation of electrical cruising energy $E_{ElecCruise}$ available for the cruising stage and equal to:

$$E_{ElecCruise} = E_{ElecTotal} \times W_{ElecMax} \cdot (T_{TakeOff} + T_{Landing})$$

where $E_{ElecTotal}$ is the total electrical energy available in the electrical energy source prior to starting the flight of the aircraft;
a fourth calculation of an electrical cruising power $W_{ElecCruise}$ available for the cruising stage and equal to:

$$W_{ElecCruise} = \text{MIN}\left(W_{Cruise};\ W_{ElecCont};\ \frac{E_{ElecTotal} - W_{ElecMax} \cdot (T_{TakeOff} + T_{Landing})}{T_{Cruise}}\right)$$

a comparison of the electrical cruising power $W_{ElecCruise}$ and the cruising power $W_{Cruise}$; and
a determination of a thermal cruising power $W_{ThCruise}$ needed for the cruising stage, such that:

if $W_{ElecCruise} = W_{Cruise}$; then $W_{ThCruise} = 0$ and if $W_{ElecCruise} < W_{Cruise}$; then $W_{ThCruise} = W_{Cruise} - W_{ElecCruise}$.

2. The method according to claim 1, wherein the method includes a fifth calculation of an electrification ratio $R_{Elec}$ for the flight of the aircraft, such that:

$$R_{Elec} = \frac{T_{TakeOff} + T_{Landing} + \text{MIN}\left(\lambda;\ \frac{W_{ElecCont}}{W_{ElecMax}};\ \frac{E_{ElecTotal} - W_{ElecMax} \cdot (T_{TakeOff} + T_{Landing})}{T_{Cruise} \cdot W_{ElecMax}}\right) \cdot T_{Cruise}}{T_{TakeOff} + T_{Landing} + \lambda \cdot T_{Cruise}}$$

where $\lambda$ is the proportion between the cruising power needed for cruising and a takeoff power needed for takeoff, i.e. the maximum electrical power $W_{ElecMax}$ of the aircraft, such that:

$$\lambda = \frac{W_{Cruise}}{W_{ElecMax}}.$$

3. The method according to claim 1, wherein the flight includes an operating reserve stage of duration $T_{Reser}$, such that the electrical cruising power $W_{ElecCruise}$ is equal to:

$$W_{ElecCruise} = \text{MIN}\left(W_{Cruise}; W_{ElecCont}; \frac{E_{ElecTotal} - W_{EleMax} \cdot (T_{TakeOff} + T_{Landing})}{T_{Cruise} + T_{Reser}}\right).$$

4. The method according to claim 2, wherein the flight includes an operating reserve stage of duration $T_{Reser}$, such that the electrical cruising power $W_{ElecCruise}$ is equal to:

$$W_{ElecCruise} = \text{MIN}\left(W_{Cruise}; W_{ElecCont}; \frac{E_{ElecTotal} - W_{ElecMax} \cdot (T_{TakeOff} + T_{Landing})}{T_{Cruise} + T_{Reser}}\right)$$

and the electrification ratio $R_{Elec}$ of the flight of the aircraft is such that:

$$R_{Elec} = \frac{T_{TakeOff} + T_{Landing} + \text{MIN}\left(\lambda; \frac{W_{ElecCont}}{W_{ElecMax}}; \frac{E_{ElecTotal} - W_{ElecMax} \cdot (T_{TakeOff} + T_{Landing})}{(T_{Cruise} + T_{Reser}) \cdot W_{ElecMax}}\right) \cdot T_{Cruise}}{T_{TakeOff} + T_{Landing} + \lambda \cdot T_{Cruise}}.$$

5. The method according to claim 1, wherein an operational energy reserve $E_{ElecReser}$ is deducted from the total available electrical energy $E_{ElecTotal}$.

6. The method according to claim 1, wherein the electrical energy source has n storage device(s), where n is an integer greater than or equal to 1, and the total available electrical energy $E_{ElecTotal}$ in the electrical energy source is such that:

$$E_{ElecTotal} = \sum_{i=1}^{n} (E_{Bat})_i$$

where i is a positive integer lying in the range 1 to n and $(E_{Bat})_i$ is the energy capacity of a storage device of rank i.

7. The method according to claim 1, wherein the electrical energy source has n storage device(s), where n is an integer greater than or equal to 1, and the total available electrical energy $E_{ElecTotal}$ in the electrical energy source is such that:

$$E_{ElecTotal} = k1 \cdot \sum_{i=1}^{n} (E_{Bat})_i$$

where i is a positive integer lying in the range 1 to n, $(E_{Bat})_i$ is the energy capacity of a storage device of rank i, and k1 is a normal utilization coefficient for the battery that is strictly less than 1.

8. The method according to claim 7, wherein in the event of an emergency and/or danger, the normal utilization coefficient k1 is replaced by an emergency coefficient k2 that is strictly greater than k1 and strictly less than 1.

9. The method according to claim 1, wherein the thermal energy source comprises at least one thermal engine, and the hybrid power plant includes a main power transmission gearbox (MGB) driving the rotors in rotation, the thermal engine(s) and the electrical machine(s) driving the MGB in rotation.

10. The method according to claim 9, wherein the hybrid power plant includes an electricity generator driven in rotation by the MGB or else directly by at least one thermal engine.

11. The method according to claim 1, wherein the thermal energy source comprises at least one thermal engine, and the hybrid power plant comprises an electricity generator and as many electric motors as there are rotors, each rotor being driven in rotation by a single electric motor, the electricity generator being driven in rotation by the thermal engine(s).

12. A multi-rotor aircraft comprising:
a hybrid power plant provided with a thermal energy source, an electrical energy source, and at least one electrical machine, the thermal energy source being capable of delivering continuous thermal power $W_{Th}$, the electrical machine(s) being capable of delivering continuous electrical power $W_{ElecCont}$ and maximum electrical power $W_{ElecMax}$; and
at least two rotors driven in rotation by the hybrid power plant;
wherein the aircraft includes a device for managing the energy of the hybrid power plant and provided with a calculator and at least one memory in order to perform the method according to claim 1.

* * * * *